C. H. VAN NOSTRAND.
METHOD OF MANUFACTURE OF GASKET AND SIMILAR MATERIAL.
APPLICATION FILED OCT. 28, 1918.
1,409,206.　　　　　　　　　　　　　　Patented Mar. 14, 1922.
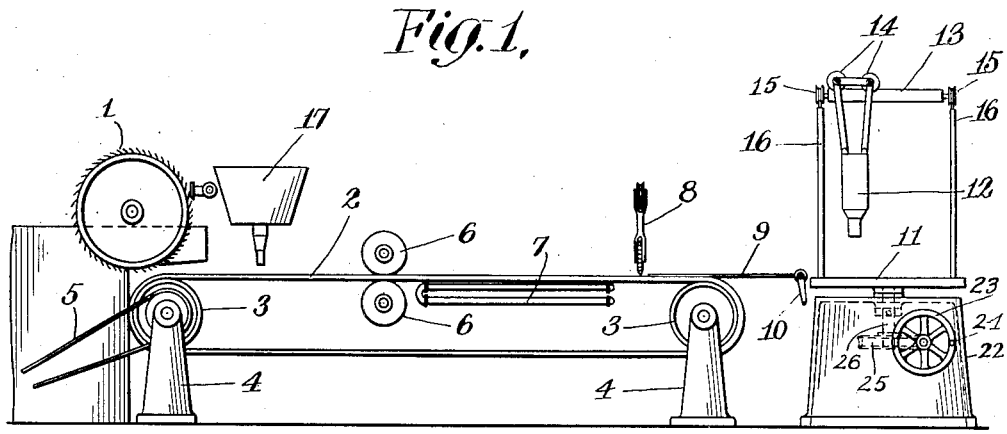
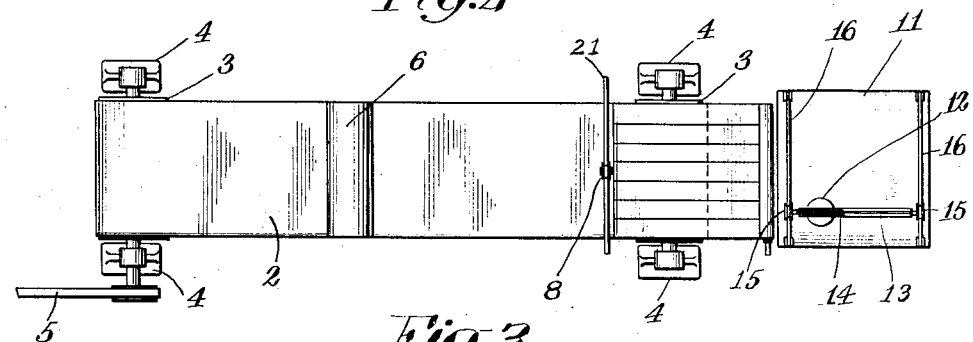
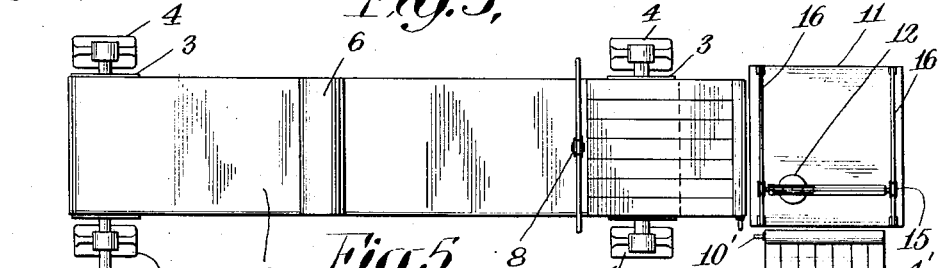
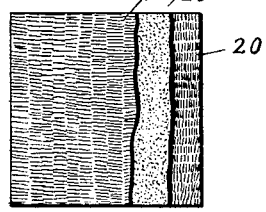
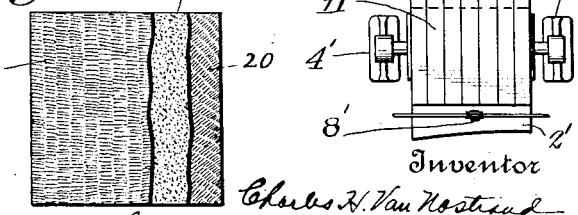
Inventor
Charles H. Van Nostrand,
By his Attorneys
Kenyon & Kenyon

UNITED STATES PATENT OFFICE.

CHARLES H. VAN NOSTRAND, OF ORANGE, NEW JERSEY.

METHOD OF MANUFACTURE OF GASKET AND SIMILAR MATERIAL.

1,409,206.　　　　　Specification of Letters Patent.　　Patented Mar. 14, 1922.

Application filed October 28, 1918. Serial No. 259,978.

*To all whom it may concern:*

Be it known that I, CHARLES H. VAN NOSTRAND, a citizen of the United States, and a resident of Orange, Essex county, State of New Jersey, have invented certain new and useful Improvements in Methods of Manufacture of Gasket and Similar Material, of which the following is a specification.

My invention relates to material adapted for use especially in gaskets and also in filtering media and for similar purposes, and to methods of manufacturing the same. It has for its object to produce such new and improved material, and it consists of the method of its manufacture herein illustrated and described.

In the drawing accompanying this specification and forming part hereof I have shown an apparatus suitable for carrying out the process and my improved product resulting therefrom in its preferred form as embodied in gasket material.

Referring to the drawings, Fig. 1 represents a side elevation of apparatus adapted to carry out my said process as applied to the production of gasket material.

Fig. 2 is a plan view of the same with certain parts omitted.

Fig. 3 is a plan view of a modified apparatus.

Fig. 4 illustrates improved gasket material embodying my invention.

Fig. 5 is a modification of the same.

Heretofore gasket material has been made out of asbestos or other suitable fibre mixed with rubber or other suitable cement but, so far as I know, no attention whatever has ever been paid to the arrangement of the fibres in the fibrous matter. Heretofore the fibrous material has been put in with the fibres running promiscuously in any and every direction. I have discovered that if the fibres in the fibrous matter are arranged substantially parallel to one another and especially if the fibres in one layer are arranged so as to run at a different angle from the parallel fibres in another layer, a very much stronger gasket material is produced, and one capable of resisting the strains and stresses to which gaskets are subjected no matter from which direction the strain comes.

Moreover, heretofore in making gasket material composed of a plurality of layers of fibrous matter united by cement, it has been the custom, so far as I am aware, to spread loose fibrous material to form a layer and without further treatment to apply cement to it, to superpose upon both another similar layer of fibrous matter, then cement, and so on until the required thickness of gasket material is obtained, and then to compress the mass. In such procedure the separate bands or layers of fibrous matter are merely layers of loose fibrous matter. I have discovered that, if each separate layer of fibrous matter is treated to make it into a compacted layer somewhat in the nature of a belt or bat before the cement is applied to it, and before a second layer of fibrous matter is superposed upon it, and then such compacted layers are superposed upon each other with a suitable uniting cement between them, a much better, harder and more durable gasket material is produced than by the old process, and when this treatment is combined with parallelism in the fibres of each layer, and especially when there is a difference in the different fibrous layers, a very superior and durable article is produced.

Referring to the apparatus shown in the drawings, 1 represents a carding machine of any well known construction. As such machines are well known, I have not shown this machine in detail. Suitable fibrous material, such as asbestos fibre is passed through this carding machine and the fibres are fed down upon an endless belt 2 and are caused by the carding machine to lie in substantially parallel lines on this endless belt. Endless belt 2 passes over rollers 3 supported in standards 4. 17 is a tank containing water which sprays water down upon the layer of asbestos fibre as it passes under the spout. 6 are pressure rollers for compressing the layers of fibrous material, and 7 represents a drying coil. 8 is a cutter which is shown, as illustrated, on a rail 21 supported in any suitable manner. This cutter is manually operated to cut the layer into sheets. These sheets pass upon the fingers 9 and a handle 10 enables the operator to turn such sheets over upon table 11. Belt 2 is driven by means of belt 5 passing over a pulley on the side of one of the rollers 3.

Table 11 is mounted so as to rotate, being mounted in bearings in standard 22. It is rotated manually by means of a hand-wheel 23 having a handle 24 through a gear on the shaft of the hand-wheel (not shown), gear 25 and shaft 26 carrying table 11. By these means the different sheets are laid upon table 11 at any desired angle.

12 is a reservoir for cement; such as rubber cement. It is mounted on a wheeled carriage 14 running on a track 13 carried by wheels 15, which wheels themselves run upon a track forming part of a light framework 16. This framework 16 consists on each side of the table of two upright rods and a cross-rod which forms one of the rails for wheels 15. By these means the reservoir 12 can be moved by the operator over all of the table 11 and a layer of cement be applied to the fibrous sheet.

After the fibrous sheet has been placed upon table 11 and coated with a layer of cement, the table is rotated a certain distance and another fibrous layer is then placed upon it and covered with a coat of cement and the table rotated again and another layer of fibrous material and another layer of cement superposed and so on until the desired thickness of gasket material is obtained.

By the above apparatus I am enabled to form gasket material composed of any desired number of fibrous layers with intervening layers of cement, the fibres of each layer of the fibrous matter being substantially parallel with one another and the direction of the line of fibres in one fibrous layer being at an angle to the direction of the fibres in another layer. Gaskets cut from such gasket material are much more durable than ordinary gaskets. Where the fibres in the different layers of the gasket run in different directions, there are always some fibres that run in a direction better calculated to stand the thrust and wear and tear to which gaskets are subjected than where the fibres are promiscuously mixed and run in any and all directions, or even in gaskets where the fibres run all in one direction, although the latter are much stronger than where there is no such arrangement of the fibres.

It will be understood that the illustration of the fibrous matter in the drawings is purely conventional, and intended merely to show the parallelism of the fibres in the different layers, and the different direction or line of parallelism in the different layers, and that in practice the fibres vary in length and overlap and intermingle with each other in each layer to make a continuous connected layer.

By my process described above each layer of fibrous matter is treated separately before being superposed upon another layer or before having another layer superposed upon it, and is so treated as to make it a compacted layer. When layers thus prepared are superposed upon one another and united by a suitable cement, they make a very hard, superior and durable gasket material. In my process, as illustrated and described, I have shown such layers compacted by wetting them and then compressing them and then drying them. One or more of these steps may be omitted, or equivalents substituted for them, or the layer may be compacted in any suitable analogous way.

In my process and in my product illustrated herein, the gasket material produced is a material from which gaskets of any desired form are to be cut, but with suitable changes in the apparatus finished gaskets may be made of the form desired without subsequent cutting.

My invention is especially applicable to gaskets and gasket material, but it is not limited in use to them. It is useful, for instance, for filtering purposes. My improved product makes a very strong, durable and efficient filtering medium, one well calculated to withstand the strains and stresses due to different currents, cross currents and pressures in a liquid being filtered. It is not easily disrupted. It may be used also for other or similar purposes. For convenience and brevity I use in the specification and claims the term "gasket material or similar material" to include not only gasket material, but such other material as filtering material or analogous material.

What I claim as new, and desire to secure by Letters Patent, is:

1. The process of making layers of fibrous matter for use in building up gasket material out of fibrous matter, which consists in spreading upon a suitable surface loose fibrous matter evenly to form a band or layer, wetting such band or layer and then compressing the band or layer into a compacted layer of fibrous matter.

2. The process of making layers of fibrous matter for use in building up gasket material out of fibrous matter, which consists in spreading upon a suitable surface fibrous matter so that the fibres of the fibrous matter are substantially parallel with one another, wetting the band or layer, and compressing and drying it to form a compacted layer of fibrous matter in which the fibres lie in substantially parallel lines.

3. The process of making gasket material composed of a plurality of layers of fibrous matter united by cement, which consists in separately making a plurality of compacted layers of fibrous matter by spreading upon a suitable surface evenly loose fibrous matter, wetting the loose fibrous matter, and compressing the same to form a compacted layer, then uniting a plurality of such compacted layers of fibrous matter together by suitable cement.

4. The process of making gasket material composed of a plurality of layers of fibrous matter united by cement, which consists in separately making a plurality of compacted layers of fibrous matter by spreading upon a suitable surface fibrous matter so that the fibres of the same lie substantially parallel with one another, wetting, compressing and drying the fibrous matter to form a compacted layer in which the fibres lie substantially in the same direction, then uniting a plurality of such layers of fibrous matter together by suitable cement.

5. The process of making gasket material composed of a plurality of layers of fibrous matter united by cement which consists in separately making a plurality of compacted layers of fibrous matter by spreading upon a suitable surface fibrous matter so that the fibres of the same lie substantially parallel with one another, and treating the fibrous matter to form it into a compacted layer in which the fibres lie substantially in the same direction, then uniting a plurality of such layers of fibrous matter together by suitable cement, the different layers being placed one on another so as to cause the fibres in one layer to run at a different angle from the fibres in an adjoining layer.

6. The process of making gasket or similar material composed of a plurality of layers of fibrous matter, which consists in separately making a plurality of compacted layers of fibrous matter by spreading upon a suitable surface fibrous matter, so that the fibres of the same lie substantially parallel with one another, wetting and compressing the fibrous matter to form it into a compacted layer in which the fibres lie substantially in the same direction, and uniting a plurality of such layers of fibrous matter together.

7. The process of making gasket or similar material composed of a plurality of layers of fibrous matter, which consists in separately making a plurality of compacted layers of fibrous matter by spreading upon a suitable surface fibrous matter, so that the fibres of the same lie substantially parallel with one another, wetting and compressing the fibrous matter to form it into a compacted layer in which the fibres lie substantially in the same direction, and uniting a plurality of such layers of fibrous matter together, the different layers being placed one on another so as to cause the fibres in one layer to run at a different angle from the fibres in an adjoining layer.

In testimony whereof, I have signed my name to this specification.

CHARLES H. VAN NOSTRAND.